United States Patent
Kruse

(10) Patent No.: US 7,450,693 B2
(45) Date of Patent: Nov. 11, 2008

(54) METHOD AND DEVICE FOR IMPROVING VOICE QUALITY ON TRANSPARENT TELECOMMUNICATION-TRANSMISSION PATHS

(75) Inventor: Gerhard Kruse, Windhagen (DE)

(73) Assignee: T-Mobile Deutschland GmbH, Bonn (DE)

( * ) Notice: Subject to any disclaimer, the term of this patent is extended or adjusted under 35 U.S.C. 154(b) by 983 days.

(21) Appl. No.: 10/275,526

(22) PCT Filed: Mar. 6, 2002

(86) PCT No.: PCT/DE02/00790

§ 371 (c)(1),
(2), (4) Date: Jan. 9, 2003

(87) PCT Pub. No.: WO02/071731

PCT Pub. Date: Sep. 12, 2002

(65) Prior Publication Data

US 2004/0037427 A1    Feb. 26, 2004

(30) Foreign Application Priority Data

Mar. 7, 2001  (DE) ............................ 101 10 983
Jul. 27, 2001  (DE) ............................ 101 36 491

(51) Int. Cl.
    *H04M 1/24* (2006.01)
(52) U.S. Cl. .................... 379/24; 455/452.1; 455/452.2
(58) Field of Classification Search ........... 370/395.21, 370/468, 477; 340/855.7; 379/24; 455/452.1–452.2
    See application file for complete search history.

(56) References Cited

U.S. PATENT DOCUMENTS

| | | | | |
|---|---|---|---|---|
| 4,000,369 A | * | 12/1976 | Paul et al. | 704/228 |
| 4,460,952 A | * | 7/1984 | Risinger | 363/61 |
| 4,639,932 A | * | 1/1987 | Schiff | 375/147 |
| 4,700,362 A | * | 10/1987 | Todd et al. | 375/249 |
| 4,950,999 A | * | 8/1990 | Agnello et al. | 324/76.22 |
| 5,136,267 A | * | 8/1992 | Cabot | 333/174 |
| 5,139,020 A | * | 8/1992 | Koestner et al. | 607/24 |
| 5,280,525 A | * | 1/1994 | Wesel | 379/400 |
| 5,471,143 A | * | 11/1995 | Doany | 324/326 |
| 5,646,940 A | * | 7/1997 | Hotto | 370/496 |
| 5,950,153 A | * | 9/1999 | Ohmori et al. | 704/217 |
| 6,226,608 B1 | * | 5/2001 | Fielder et al. | 704/229 |
| 6,510,313 B1 | * | 1/2003 | Rapeli | 455/323 |

FOREIGN PATENT DOCUMENTS

| | | |
|---|---|---|
| DE | 28 40 243 | 5/1988 |
| DE | 43 43 366 | 6/1995 |

(Continued)

*Primary Examiner*—Fan Tsang
*Assistant Examiner*—Simon Sing
(74) *Attorney, Agent, or Firm*—Baker & Daniels LLP

(57) ABSTRACT

A method and a device for improving voice quality on transparent telecommunications-transmission paths. The audio-transmission channel is adapted to the respective audio-spectrum of the speaker at predetermined intervals. As a result, means for analyzing the voice signals in relation to the useful band width and amplitude thereof are provided in addition to means for influencing the band width and amplitude of the audio-transmission channel according to the determined useful band and amplitude. Such means can be installed in the communication terminal as well as in the communication network.

13 Claims, 1 Drawing Sheet

FOREIGN PATENT DOCUMENTS

| | | |
|---|---|---|
| DE | 44 05 723 | 8/1995 |
| DE | 198 52 091 | 5/2000 |
| DE | 198 52 805 | 5/2000 |
| EP | 0 539 017 | 4/1993 |
| EP | 0 705 016 | 4/1996 |
| WO | WO 97/32430 | 9/1997 |

* cited by examiner

METHOD AND DEVICE FOR IMPROVING VOICE QUALITY ON TRANSPARENT TELECOMMUNICATION-TRANSMISSION PATHS

BACKGROUND OF THE INVENTION

The invention relates to a method and a device for improving voice quality on transparent telecommunications paths.

With transparent voice transmission channels, such as e.g. used in mobile telecommunication systems via GSM or UMTS standards, the digital voice signal is sent with no extra Radio Link Protocol (RLP). Radio Link Protocol is a radio transmission route protocol that is transmitted in addition to the useable signal and also ensures quality of the data during transmission.

When using transparent transmission, the voice quality is influenced on the spokesperson's end by:

Interference occurring outside of the acoustic spectrum of the spokesperson but within the NF transmission band width of the telecommunication device, e.g. environmental noise.

Voice patterns of the spokesperson, e.g. inarticulate and/or speaking too quietly, as well as the language of the spokesperson.

Speaking too loudly only slightly affects the listener's ability to understand what is being said but can be uncomfortable.

There are already new known technical means of improving voice quality in telecommunications transmission.

According to DE 198 52 091 C1, an equalizer is routed into the audio path preferably between BSC and MSC. The equalizer compensates for the influences in audio quality between the two participating end devices.

DE 198 52 805 A 1 processes signals from at least two microphones with a voice processing algorithm, whereby background interference noise is compensated by 180° phase angle rotation.

Both of these methods are associated with extra technical requirements in the end devices or in the communication network systems.

SUMMARY OF THE INVENTION

The task of the following invention is therefore to recommend a process and a system of suppressing environmental noise outside of the voice spectrum and to improve voice quality based on the audio spectrum and the individual volume of the spokesperson.

This task will be handled by means of the process of adjusting the audio transmission channel in defined time intervals to the corresponding audio spectrum of the spokesperson. Solutions for this are included in a means of analyzing the voice signals according to the used band width and amplitude as well as a means of influencing the band width $\Delta f$ and amplitude v of the audio transmission channel based on the used band width and amplitude that are determined. These means can be installed in the communication transmission devices and in the communication network itself.

The audio spectrum of voice signals is mainly determined through:

Voice: distinct differences result between vocal ranges, e.g. Roman languages with intonation on the formant and vocally soft, melodious languages with normally higher band widths and more dynamic in the volume such as Arabic for example.

Vocal register (tessitura), e.g. Soprano or tenor and tone color, i.e. the voice emission and spectrum of the formants.

Intonation which is mainly characterized as clear or unclear. Unclear intonation muffles formants.

Based on a preferred best-case instance of the invention, the voice signals are then analyzed in an analyzer for usable band width $\Delta f$, mid-range frequency $f_O$ and amplitude v.

Control signals with voice signal information on the band width $\Delta f$, mid-range frequency $f_O$ and amplitude v from the determined frequency/amplitude analysis parameters will then preferably be generated in a microprocessor.

Based on a preferred best-case instance of the invention, control signals are used on the determined mid-range frequency $f_O$ and band width $\Delta f$ of the voice signal for controlling a band pass filter whereas the transmission characteristics are defined in accordance with the determined parameters.

The control signal is also fed into a controllable amplifier along with the determined amplitude. The amplification is defined depending on the determined amplitude of the voice signal. To achieve optimal voice pattern recognition (optimally understandable), the amplifier has integrated logarithmic transmission characteristics.

Since the control signals are regenerated in timed intervals $\tau$ by the microprocessor, a quasi-continuous adjustment of the audio transmission channel to the voice spectrum of the spokesperson is achieved.

BRIEF DESCRIPTION OF THE DRAWINGS

An example of an application in graphic representation

DETAILED DESCRIPTION

Figure 1:
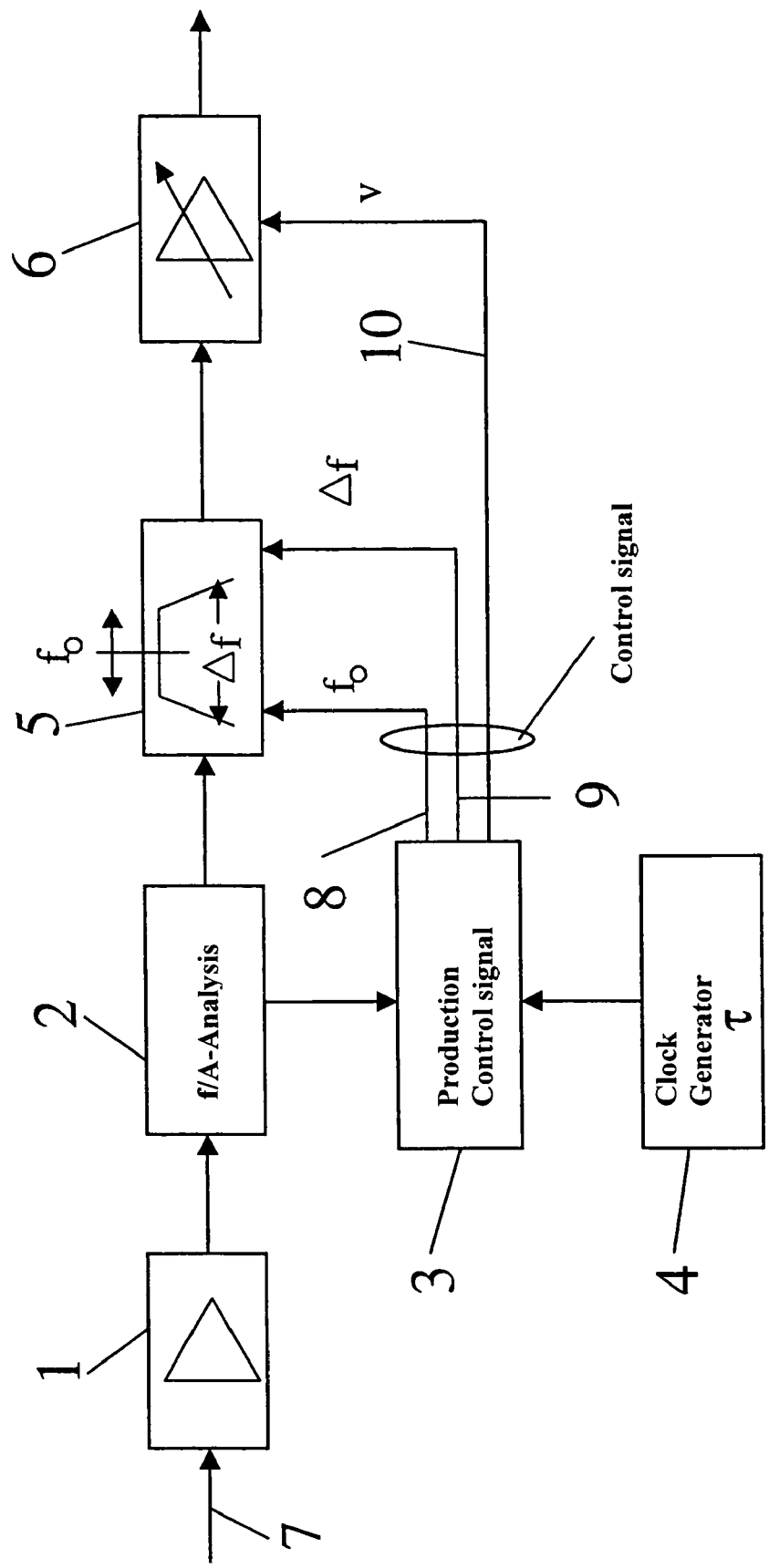
FIG. 1 shows the invention in further detail. Further features, advantages and application possibilities can be attained from FIG. 1 and the corresponding description.

The device will preferably be installed in a telecommunications transmitting device between the microphone output or pre-amplifier and the following components (voice encoder in digital mobile telephones). Basically, it could also be installed in a communication network, e.g. in a network node.

The voice signal 7 (input signal) from the microphone is amplified by a first linear amplifier 1 to such a level that the signal can be analyzed according to frequency and amplitude in an analyzer 2 in the next step. Broken down, the analyzer 2 will determine the signal band width $\Delta f$, mid-range frequency $f_O$ and the amplitude v of the voice signal 7.

Three control signals 8-10 containing the information on the voice signal consisting of band width $\Delta f$, mid-range frequency $f_O$ and amplitude v are generated from the determined parameters from the frequency/amplitude analysis in a control unit, e.g. a microprocessor 3.

These three control signals 8-10 are regenerated in time intervals $\tau$ (e.g. $\tau=5$ sec.) by the microprocessor. A clock generator 4 generating at $\tau$ causes a reset of the microprocessor 3 after which the control signal is determined again. The interval $\tau$ will preferably be able to be defined and can be set and optimized to the spokesperson.

The control signals 8, 9 are used with the determined mid-range frequency $f_O$ and the band width of the voice signal for controlling a band pass filter 5 with transmission characteristics defined based on the determined parameters.

Just as an example, the useable transmission band width of the NF channel of a communication transmitting device is 300 to 3400 Hz.

The analyzer determines an actual band width for a given spokesperson of e.g. 350 to 2500 Hz at a mid-range frequency $f_O$ of 1450 Hz however. The band pass filter 5 is adjusted to the determined values whereas interference signals which are outside of the defined cutoff frequencies of 350 Hz or 2550 Hz are effectively suppressed.

Using the device based on the invention, especially the adaptive band pass filter 5 which controls the mid-range and cutoff frequencies preferably via digital signals, the NF transmission characteristics are adjusted almost continuously in time intervals τ to the audio spectrum of the corresponding spokesperson, i.e. adapted to the voice, vocal register and intonation of the respective spokesperson.

The voice signal is regulated for optimal understanding (generally boosted) using information 10 on the amplitude of the voice signal in a controlled amplifier 6 via preferably logarithmic response curves. The logarithmic response curve of this amplifier 6 puts the emphasis on the formants of a spokesperson whereby, especially for muffled intonation and vocally toned languages, the ability to understand the voice is greatly improved on the listening end.

The invention claimed is:

1. A method for improving the quality of a voice signal on a transparent audio telecommunication channel, comprising:
   analyzing the voice signal in an analyzer for useable band width and mid-range frequency, the useable bandwidth and mid-range frequency defining the audio spectrum of the voice signal, and further analyzing the amplitude of the signal;
   generating a plurality of control signals based on the analysis of the voice signal in the analyzer including a bandwidth control signal based on the useable bandwidth of the voice signal and a signal containing information as to the mid-range frequency of the voice signal; and
   utilizing the plurality of control signals to adjust the audio telecommunication channel in defined time intervals, the step of adjustment including using the bandwidth control signal and mid-range frequency control signal to control a band pass filter that passes the voice signal to adjust the bandwidth and mid-range frequency of the telecommunication channel to the audio spectrum of the voice signal to thereby suppress environmental noise outside of the useable audio bandwidth spectrum of the voice signal and to improve the quality of the voice signal being transmitted.

2. The method of claim 1 wherein the plurality of control signals is generated by a microprocessor.

3. The method of claim 1 wherein said control signals contain information as to the amplitude of the voice signal resulting from the analysis thereof in the analyzer.

4. The method of claim 3 wherein the plurality of control signals is generated by a microprocessor.

5. The method of claim 3 and controlling a controllable amplifier by means of the control signals containing information as to the amplitude for the voice signal.

6. The method of claim 5 wherein said amplifier has logarithmic transmission characteristics.

7. The method of claim 5 wherein the control signals are generated by a microprocessor in said defined time intervals.

8. The method of claim 5 wherein the control signals are generated by a microprocessor in said defined time intervals.

9. The method of claim 1 and controlling a controllable amplifier by means of a control signal containing information as to the amplitude for the voice signal.

10. A device for improving the quality of a voice signal in a transparent audio telecommunication channel, comprising:
    an analyzer that analyzes the voice signal for useable bandwidth and mid-range frequency, which define the audio spectrum of the voice signal, and amplitude of the signal and produces an output signal that corresponds thereto;
    a microprocessor that receives the output from said analyzer and generates a plurality of control signals based on the analysis in the analyzer, respectively, of the band width, mid-range frequency and overall amplitude of the voice signal;
    a band pass filter that receives the control signals based on the band width and mid-range frequency analysis and configures the voice signal in the audio telecommunication channel based thereon, the configuration of the voice signal using the control signals based on mid-range frequency and bandwidth to adjust the mid-range frequency and bandwidth of the telecommunication channel to the audio spectrum of the voice signal; and
    a controllable amplifier that receives the control signal based on the amplitude analysis and amplifies the overall voice signal based thereon;
    whereby environmental noise outside of the useable audio bandwidth spectrum of the voice signal is suppressed and the quality of the voice signal being transmitted is improved.

11. The device of claim 10 installed between a microphone and components downstream therefrom.

12. The device of claim 11 installed in a telecommunications network.

13. The device of claim 12 installed between a microphone and components downstream therefrom.

* * * * *